United States Patent [19]

Hoaglin et al.

[11] 4,222,795
[45] Sep. 16, 1980

[54] PIPE CUTTING APPARATUS AND METHOD

[75] Inventors: Harold B. Hoaglin, Sylacauga; James R. Grill, Birmingham; Jack H. Keller, Cullman, all of Ala.

[73] Assignee: Chicago Bridge & Iron Company, Oak Brook, Ill.

[21] Appl. No.: 18,925

[22] Filed: Mar. 9, 1979

[51] Int. Cl.² .......................... B23K 7/04; B23K 7/10
[52] U.S. Cl. ..................................... 148/9.6; 266/57; 266/60
[58] Field of Search ........................... 266/57, 60, 61; 148/9.6, 9 R

[56] References Cited
U.S. PATENT DOCUMENTS

| | | | |
|---|---|---|---|
| 3,409,282 | 11/1968 | Livers | 266/56 |
| 3,430,938 | 3/1969 | Blackburn | 266/57 |
| 3,614,077 | 10/1971 | Blackburn | 266/57 |
| 4,127,256 | 11/1978 | Jacobs | 266/57 |
| 4,143,862 | 3/1979 | Krieg | 266/56 |

Primary Examiner—T. M. Tufariello
Attorney, Agent, or Firm—Merriam, Marshall & Bicknell

[57] ABSTRACT

Apparatus for cutting and beveling pipe comprising a horizontally positioned and movable member, roller means to support and axially rotate a horizontal pipe parallel to the member, a photocell scanner mounted on the member and positioned to follow a profile template circumscribing a pipe on the roller means, drive means, responsive to a signal from the photocell scanner, adapted to move the member horizontally in either axial direction as the photocell scanner follows the profile template, a cutting torch pivotally supported by a mounting on the member and positioned to cut through a pipe, rotating axially on the roller means, in a cutting path having the same profile as the template, a support on the member movable axially of a pipe on the roller means, a second photocell scanner mounted on the movable support and positioned to follow a bevel contour template circumscribing a pipe on the roller means, an arm extending from the support and pivotally connected with the cutting torch, and drive means, responsive to a signal from the second photocell scanner, adapted to move the support and arm in either axial direction as the said photocell scanner follows the bevel contour template thereby orienting the cutting torch at an angle to cut a pipe wall with a bevel.

7 Claims, 6 Drawing Figures

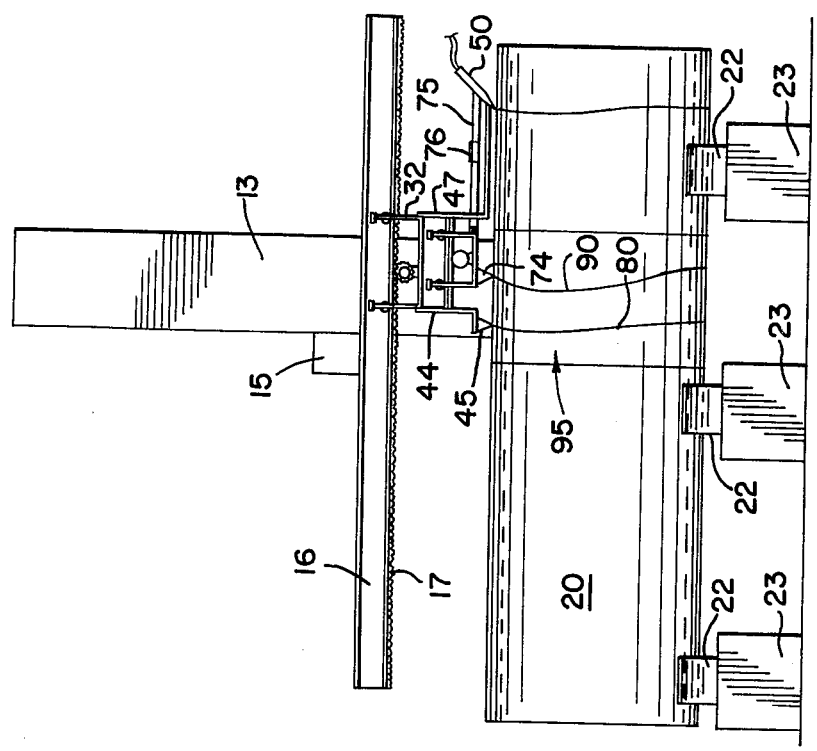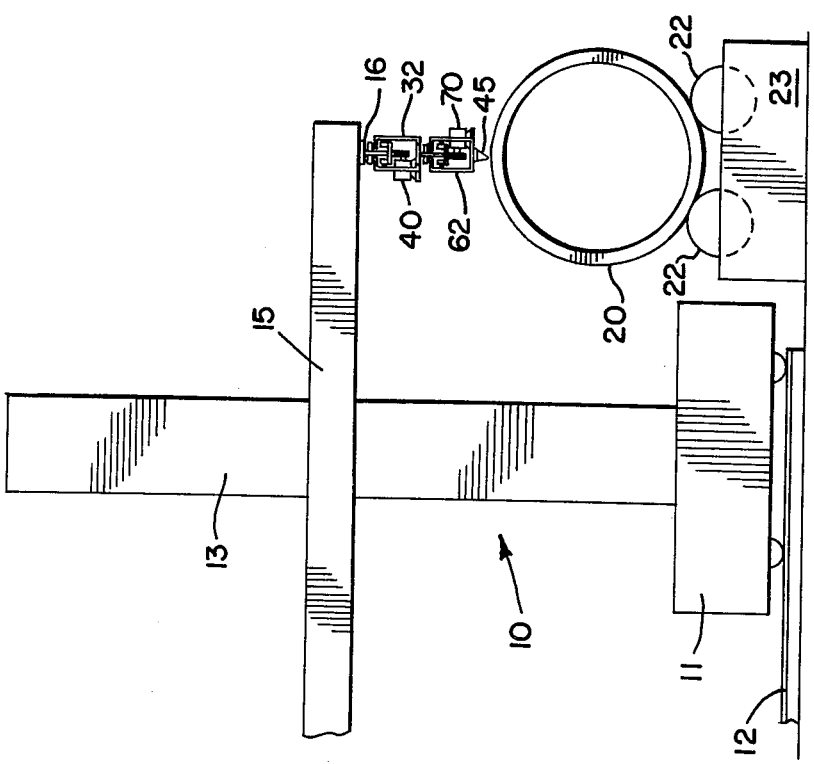

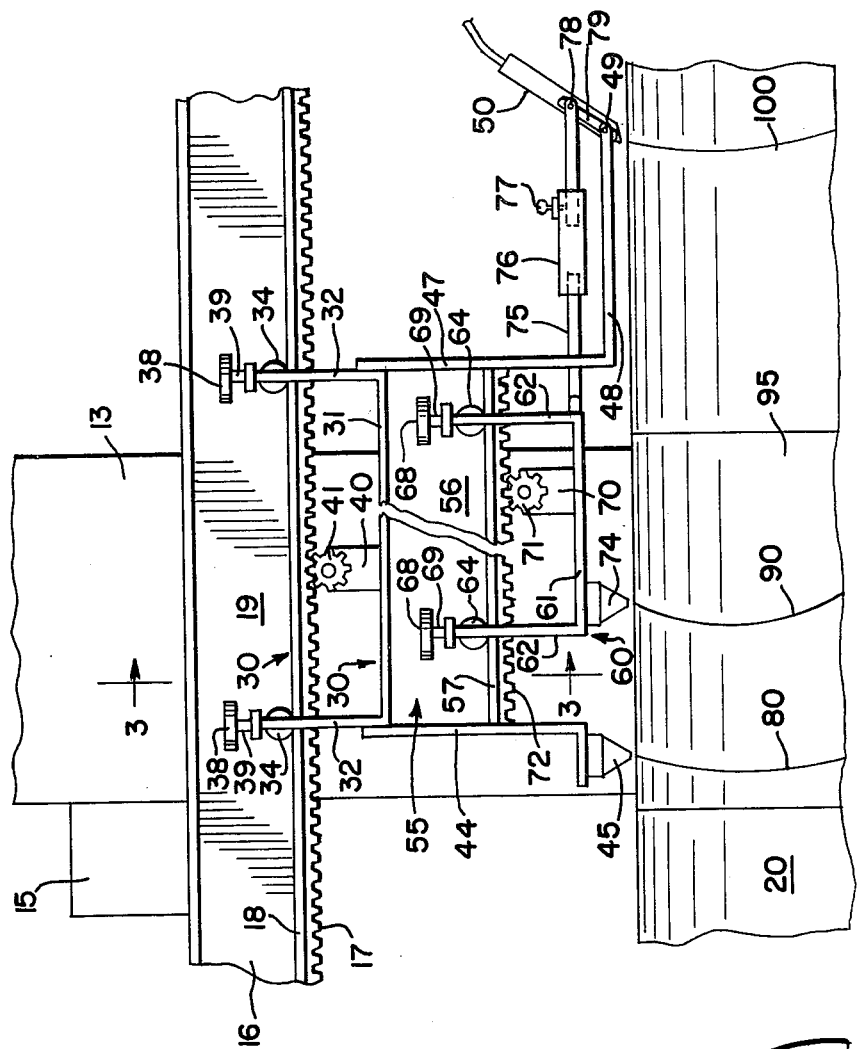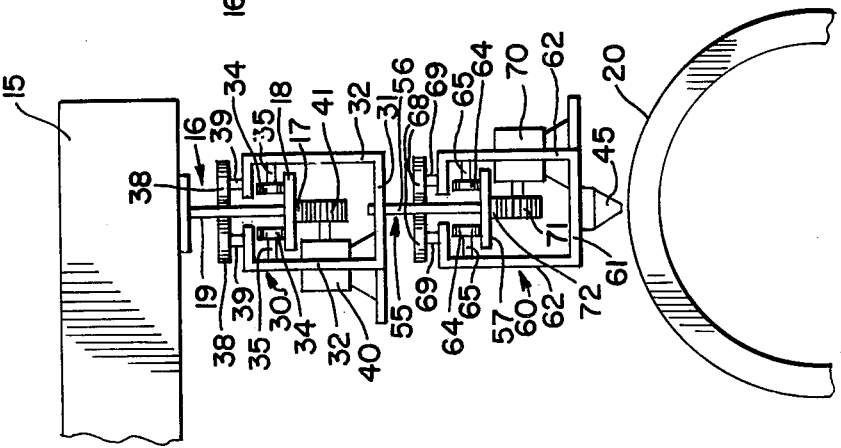

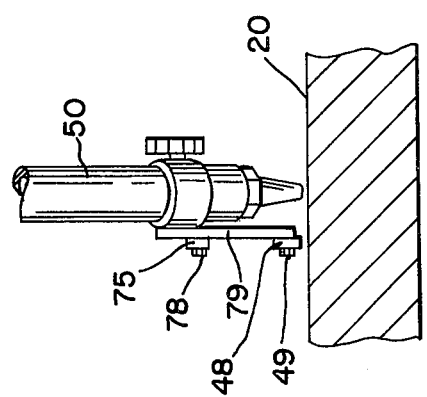
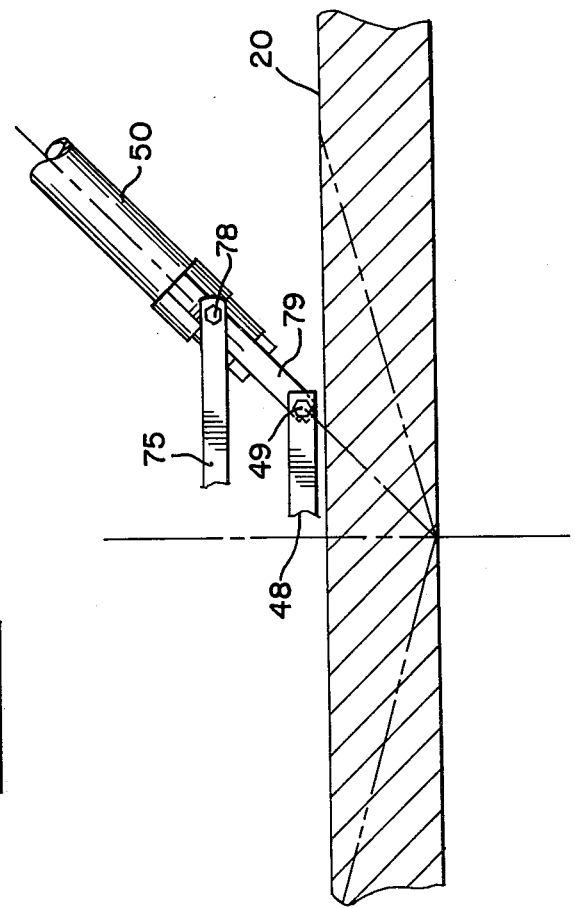

PIPE CUTTING APPARATUS AND METHOD

This invention relates to apparatus and methods for cutting shapes. More particularly, this invention is concerned with apparatus and methods for cutting pipe to provide a pipe end having a contour or profile with a suitable varying bevel for welding at an angle to another pipe or surface.

BACKGROUND OF THE INVENTION

1. Field of the Invention

Many large structures and related facilities which are built require the use of large size pipe. While joining such pipes axially by welding is not particularly difficult, it is sometimes necessary for such pipes to intersect other pipes, of the same or larger size, at an angle, in most cases from about 30° to 90°, and to be joined by welding. Offshore towers for oil and gas exploration and production are quite often made of large size pipe with pipe used for the legs and braces, both lateral and otherwise angled, between the legs. The ends of the pipe braces are contoured or profiled to fit very closely against the surface of the legs and other surfaces to facilitate fabrication of a strong economical welded joint. Unless the properly beveled pipe brace end fits close to the leg, or some other surface to which it is to be joined, an excessive deposit of weld metal will be needed to complete the joint, thus increasing costs and fabrication time and, more importantly, the needed weld quality cannot be obtained.

It is not possible to standardize on an intersecting pipe end profile or contour because the intersected or trunk pipe and the intersecting or branch pipe for different structures can vary in diameter and thickness, and the angle of intersection can also vary. These variables inherently change the intersecting pipe end profile. A further factor is involved because the intersecting or branch pipe wall thickness affects the bevel desired for welding the joint.

2. Description of the Prior Art

Pipe Beveling Machine Co., Inc., Tulsa, Okla., offers commercially an intersectional pipe cutting apparatus represented as related to U.S. Pat. No. 3,409,282. The apparatus of the patent rotates on a ring gear around a pipe to be cut. The torch also rotates about the pipe and cuts a contour corresponding with a template edge which surrounds the pipe. The torch cuts the pipe wall laterally or at a fixed bevel. This apparatus lacks flexibility because of the fixed bevel obtained and because separate ring gears are needed for each narrow range of pipe diameters and because a separate metal template is required for each different intersecting contour.

Vernon Tool Company, Alhambra, Calif., has U.S. Pat. Nos. 3,430,938 and 3,614,077 on pipe cutting and handling apparatus. U.S. Pat. No. 3,430,938 discloses a geometric mechanism for torch cutting a contour on a rotating pipe. As the pipe rotates, a cam synchronized therewith drives an adjustable crank which moves a cutting torch support axially of the pipe to cut the contour. Such apparatus requires adjustment of the crank with change in pipe diameter and/or angle of intersection to obtain the desired pipe and contour. Also, variable pipe wall bevels are not producible with the apparatus.

SUMMARY OF THE INVENTION

According to one aspect of the invention, there is provided an apparatus comprising in combination, a horizontally positioned and movable member, roller means to support and axially rotate a horizontal pipe parallel to the member, a photocell scanner mounted on the member and positioned to follow a profile template circumscribing a pipe on the roller means, drive means responsive to a signal from the photocell scanner adapted to move the member horizontally in either axial direction as the photocell scanner follows the profile template, a cutting torch pivotally supported by a mounting on the member and positioned to cut through a pipe rotating axially on the roller means in a cutting path having the same profile as the profile template, a support on the member movable axially of a pipe on the roller means, a second photocell scanner mounted on the movable support and positioned to follow a bevel contour template circumscribing a pipe on the roller means, an arm extending from the support and pivotally connected with the cutting torch, and drive means responsive to a signal from the second photocell scanner adapted to move the support and arm in either axial direction as the said photocell scanner follows the bevel contour template thereby orienting the cutting torch at an angle to cut a pipe wall with a bevel.

The roller means desirably includes a drive system to rotate a pipe supported by the roller means. The roller means is advantageously controllable as to the speed at which it rotates a pipe supported thereon independently of the horizontal speed and vice versa at which the member moves so that flexibility of cutting can be achieved.

The member is preferably guided by and rollably movable on a horizontal carriage beam. In addition, the support desirably is guided by and rollably movable on the member.

It is also advantageous to have the arm adjustable in length so that the cutting torch angle can be adjusted to the proper angle at the start of cutting.

According to a second aspect of the invention there is provided a method of cutting the end of a first pipe for intersection with a second pipe by placing a first pipe on roller means to support and axially rotate it horizontally, placing a profile template and a spaced-apart bevel contour template circumferentially on the pipe, positioning a member to move parallel to the pipe, said member having a cutting torch pivotally supported by a mounting on the member, a first photocell scanner spaced from the torch and positioned to follow the profile template and drive means responsive to a signal from the first photocell scanner adapted to move the member horizontally in either direction axially of the pipe as the photocell scanner follows the profile template, said member having a support movable axially of a pipe on the roller means, a second photocell scanner mounted on the movable support and positioned to follow a bevel contour template circumscribing a pipe on the roller means, an arm extending from the support and pivotally connected with the cutting torch, and drive means responsive to a signal from the second photocell scanner adapted to move the support and arm in either direction axially of the pipe as the second photocell scanner follows the bevel contour template, rotating the pipe on the roller means and lighting the cutting torch, and activating the first and second photocell scanners and the drive means activated by each so that as the pipe rotates the first photocell scanner follows the profile template and automatically moves the cutting torch to cut the pipe with a profile corresponding to the profile template and the second photocell scanner follows the bevel contour template and automatically angles the cutting torch to cut the pipe wall with a bevel while maintaining the profile cut.

BRIEF DESCRIPTION OF THE DRAWINGS

FIG. 1 is a side elevational view of a welding positioning and manipulator unit used to support the apparatus of the invention for pipe cutting;

FIG. 2 is a front elevational view of the structure shown in FIG. 1;

FIG. 3 is an enlarged view of the apparatus of the invention as shown in FIG. 1 and constitutes a sectional view taken along the line 3—3 of FIG. 4;

FIG. 4 is an enlarged view of the apparatus of the invention as shown in FIG. 2;

FIG. 5 is a front elevational view of the cutting torch and its mounting; and

FIG. 6 is a side elevational view of the cutting torch and mounting as shown in FIG. 5.

DETAILED DESCRIPTION OF THE DRAWINGS

The same numbers will be used to identify the same or similar parts or elements in the various views of the drawings to the extent this is practical.

With reference to FIGS. 1 and 2, a commercially available welding positioning and manipulator unit 10 is used as the basic structure to support and move the apparatus provided by the invention as will be subsequently described. The manipulator 10, available from Pandjiris, St. Louis, Mo., has a wheeled car 11 which rolls on tracks 12 positioned lateral to the axis of the pipe 20 to be cut. Manipulator column 13 is vertically and securely positioned on car 11. Manipulator beam 15 is mounted horizontally on column 13. Beam 15 is vertically displaceable up or down while horizontally positioned. Extending laterally from beam 15 is horizontal main carriage beam 16 located axially over pipe 20. Beam 16 is an I-beam with a gear rack 17 located on the bottom of the beam lower flange 18.

Pipe 20 is rotatably positioned on the turning rolls 22 (FIGS. 1 and 2) which are commercially available (Pandjiris) with a supporting framework 23 and drive mechanism. The turning rolls operate in pairs and at least one roll of one pair is drivable by suitable conventional means which permits axial rotation of the pipe 20 at an infinitely variable speed within a predetermined range.

Horizontally positioned and movable member 30 has a horizontal plate 31 (FIGS. 3 and 4) and four legs 32 with one at each corner of the plate. Each leg supports a vertical roller 34 which rotates on a horizontal axle 35 and a horizontal roller 38 which rotates on a vertical axis 39. The vertical rollers 34 roll on the top of lower flange 18 of I-beam 16, with two of the rollers on each side of web 19. The horizontal rollers 38 roll against web 19, with two of the rollers on each side of it. A motor 40 is mounted on plate 31. Drivably engaged with motor 40 is gear 41 which meshes with gear rack 17. By the described drive means, the member 30 can be moved in either direction along beam 16 axial to pipe 20.

Vertically positioned and projecting downwardly from one end of plate 31 is bar 44 which has a first photocell scanner 45 mounted at the end and positioned to follow profile template 80. Bar 47 is mounted on the other end of plate 31 and at its lower end a bar 48 extends outwardly to a pivotal connection 49 with cutting torch 50. Extending between the vertical bars 44 and 47, and constituting part of member 30, is an interted T-beam 55 having a vertical web 56 and a horizontal flange 57. The top edge of web 56 is joined to the bottom of plate 30.

Support 60 is rollably supported by member 30. Support 60 has a horizontal plate 61 and four legs 62 with one leg at each corner of the plate. Each leg 62 supports a vertical roller 64 which rotates on a horizontal axle 65, and a horizontal roller 68 which rotates on a vertical axle 69. The vertical rollers 64 roll on the top of flange 57, with two of the rollers on each side of web 56. The horizontal rollers 68 roll against web 56, with two of the rollers on each side of it. A motor 70 is mounted on plate 61. Drivably engaged with motor 70 is gear 71 which meshes with gear rack 72 on the bottom of plate 57. By means of the described drive means, the support 60 can be moved in either direction along the plate 57 axial to pipe 20.

Mounted on the bottom of plate 61 is a second photocell scanner 74 positioned to follow bevel contour template 90. Extending outwardly from one end of plate 61 is arm 75 having a sleeve 76 with a set screw 77 so that the arm can be lengthened or shortened to properly position cutting torch 50 at the correct angle when cutting starts. Arm 75 is joined by pivot 78 to the cutting torch by means of link 79.

Although the profile template 80 in the form of a line and the bevel contour template 90 in the form of a line can be marked directly on pipe 20, it is desirable to have these lines marked on a sheet of white paper 95 and to then wrap the paper around the pipe. In this way the template lines are removably positioned to circumscribe the pipe. After the pipe cutting is completed the paper template can be removed and reused.

The photocell scanners 45 and 74 and control system is available from C & G Associates, Elk Grove Village, Ill. Stewart-Warner Electronics, Chicago, Ill. also supplies an optical tracing system which can be used to follow the template lines. The X-Y coordinate drive systems of commercial cutting machines can be adapted for use in this invention. An X-coordinate drive system can be used to drive member 30 holding the torch and the Y-coordinate drive system can be used to drive the rolls to rotate the pipe. An X-coordinate drive system can also be used to drive support 60 to angle the torch to cut a bevel.

If the pipe to be cut had a wall which is very thin there would be no need to cut the pipe end with a continuously changing bevel and the photocell scanner 74 could be eliminated since a cut at 90° to the pipe axis would provide an edge sufficiently close for welding to an intersected pipe by deposition of an acceptable amount of weld metal. However, if thick walled pipe ends of intersecting pipes are not beveled, an excessive amount of welding would be needed to produce an acceptable joint.

Production of templates for use in the invention is readily achieved using known geometric mathematics for intersecting cylinders. The profile template must take into account the thickness of the pipe to properly guide the cutting torch to obtain the desired contact between the end of the intersecting or branch pipe being cut and the intersected or trunk pipe. It has been found that proper contact can be achieved by having the contact line located on the inside diameter or outside diameter of the branch pipe. It should be understood, further, that the angle of bevel is not cut to achieve precise surface-to-surface contact but is selected to provide suitable clearance between the surfaces for the deposition of a weld.

In using the apparatus of the invention, the paper template is positioned on pipe 20 and member 30 is moved until the photocell scanner 45 is positioned over the profile template 80. The profile template 80 governs the overall shape of the cut 100 to be made in pipe 20. The cut 100 when completed will be parallel to profile template 80. The photocell scanner 74 is then positioned over the bevel contour template 90 which will desirably contain bevel degree markings periodically alongside the template. The set screw 77 in sleeve 76 is released and the torch 50 is pivoted to an angle corresponding with the angle marking on the template adjacent the photocell scanner 74. The set screw 77 is then tightened. Cutting torch 50 is then lit. The mechanism which drives the rollers 22 to rotate the pipe 20 is activated as well as the photocell scanners 45 and 74 and the drives associated therewith to move member 30 and support 60 axially of the pipe as controlled by the photocell scanners. Since the distance between templates 80 and 90 varies, the distance between the photocell scanners will also vary in following the templates. As this distance changes, arm 75 pivotally pushes or pulls torch 50 thereby continuously changing the angle at which the torch cuts the pipe. It is essential, of course, that the profile template photocell scanner 45 exert dominance over the contour bevel template photocell scanner 74 to prevent pivot 78 from being the pivot center instead of pivot 49. Pivot 49 must be the pivot center in order to have the cut 100 correspond with profile template 80.

Pipe cutting as described provides highly accurate well-fitting pipe ends. Even out of roundness of the pipe does not significantly adversely affect the accuracy since the photocell scanners and the cutting torch move axially to the pipe as a unit thereby maintaining a fixed distance. In this way the distance from the template to the cutting path is kept constant because the photocell scanners precisely follow the templates. Even when the pipe moves axially on the rollers, as unintentionally but frequently happens, the cut is accurately made since the photocell scanners follow the templates while the distance between the photocell scanners and the cutting torch is constant.

The foregoing detailed description has been given for clearness of understanding only, and no unnecessary limitations should be understood therefrom, as modifications will be obvious to those skilled in the art.

What is claimed is:

1. Apparatus in combination comprising:
   a horizontally positioned and movable member,
   roller means to support and axially rotate a horizontal pipe parallel to the member,
   a photocell scanner mounted on the member and positioned to follow a profile template circumscribing a pipe on the roller means,
   drive means, responsive to a signal from the photocell scanner, adapted to move the member horizontally in either axial direction as the photocell scanner follows the profile template,
   a cutting torch pivotally supported by a mounting on the member and positioned to cut through a pipe, rotating axially on the roller means, in a cutting path having the same profile as the template,
   a support on the member movable axially of a pipe on the roller means,
   a second photocell scanner mounted on the movable support and positioned to follow a bevel contour template circumscribing a pipe on the roller means,
   an arm extending from the support and pivotally connected with the cutting torch, and
   drive means, responsive to a signal from the second photocell scanner, adapted to move the support and arm in either axial direction as the said photocell scanner follows the bevel contour template thereby orienting the cutting torch at an angle to cut a pipe wall with a bevel.

2. Apparatus according to claim 1 in which the roller means includes a drive system to rotate a pipe supported by the roller means.

3. Apparatus according to claim 2 in which the roller means is controllable as to the speed at which it rotates a pipe supported thereon independently of the horizontal speed at which the member moves.

4. Apparatus according to claim 1 in which the member is guided by and rollably movable on a horizontal carriage beam.

5. Apparatus according to claim 4 in which the support is guided by and rollably movable on the member.

6. Apparatus according to claim 1 in which the arm is adjustable in length.

7. A method of cutting the end of a first pipe for intersection with a second pipe, comprising:
   placing a first pipe on roller means to support and axially rotate it horizontally,
   placing a profile template and a spaced-apart bevel contour template circumferentially on the pipe,
   positioning a member to move parallel to the pipe, said member having a cutting torch pivotally supported by a mounting on the member, a first photocell scanner spaced from the torch and positioned to follow the profile template, and drive means responsive to a signal from the first photocell scanner adapted to move the member horizontally in either direction axially of the pipe as the photocell scanner follows the profile template,
   said member having a support movable axially of a pipe on the roller means, a second photocell scanner mounted on the movable support and positioned to follow a bevel contour template circumscribing a pipe on the roller means, an arm extending from the support and pivotally connected with the cutting torch, and drive means responsive to a signal from the second photocell scanner adapted to move the support and arm in either direction axially of the pipe as the second photocell scanner follows the bevel contour template,
   rotating the pipe on the roller means and lighting the cutting torch,
   activating the first and second photocell scanner and the drive means activated by each so that as the pipe rotates the first photocell scanner follows the profile template and automatically moves the cutting torch to cut the pipe with a profile corresponding to the profile template and the second photocell scanner follows the bevel contour template and automatically angles the cutting torch to cut the pipe wall with a bevel while maintaining the profile cut.

* * * * *